(12) United States Patent  
Walton

(10) Patent No.: US 7,774,631 B1
(45) Date of Patent: Aug. 10, 2010

(54) METHOD AND SYSTEM FOR MINIMIZING POWER CONSUMPTION IN A MULTIPROCESSOR DATA STORAGE SYSTEM

(75) Inventor: John K. Walton, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 634 days.

(21) Appl. No.: 11/824,112

(22) Filed: Jun. 30, 2007

(51) Int. Cl.
*G06F 1/32* (2006.01)

(52) U.S. Cl. ................ 713/321; 713/322; 713/323; 711/100; 365/227

(58) Field of Classification Search ......... 713/321–323; 711/100; 365/227
See application file for complete search history.

(56) References Cited

U.S. PATENT DOCUMENTS 5,809,314 A * 9/1998 Carmean et al. ............ 713/322
6,535,985 B1 * 3/2003 Oshima et al. ............. 713/323
2005/0066209 A1 * 3/2005 Kee et al. .................. 713/323

* cited by examiner

*Primary Examiner*—Thuan N Du
(74) *Attorney, Agent, or Firm*—Krishnendu Gupta; Scott A. Ouellette

(57) ABSTRACT

A system for minimizing power consumption of a multiprocessor data storage system is disclosed. The system utilizes processors that are capable of operating at a number of different reduced power modes, such that the processors operate at full power during peak workloads, but can be powered down during low workload times. When the onset of peak loads are detected through monitoring I/Os per second ("IOPS") and/or response times of the system, the processors are brought out of power-down mode to handle the increased IOPS during the peak loads. In this manner, the majority of the processors only operate at full power when the system experiences peak loads. During normal and low load times, the processors are either operated at reduced power or are powered down. This results in a significant reduction in power consumption of the system.

1 Claim, 5 Drawing Sheets

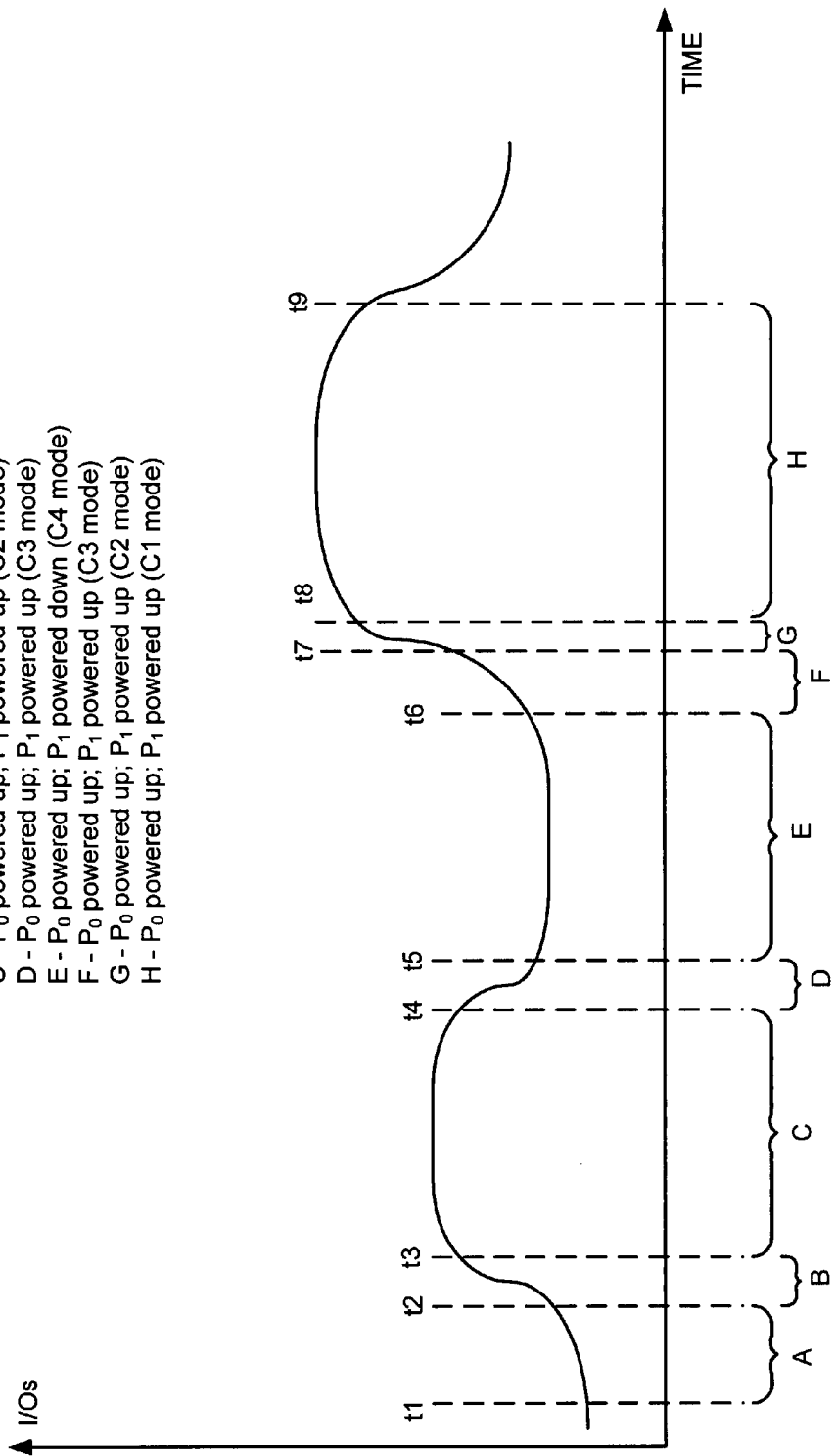

METHOD AND SYSTEM FOR MINIMIZING POWER CONSUMPTION IN A MULTIPROCESSOR DATA STORAGE SYSTEM

FIELD OF THE INVENTION

This invention relates generally to a method and system for minimizing power consumption in a multiprocessor data storage system and, more particularly, to a method and system for monitoring a performance indicator of the data storage system and powering up/down processors to process inputs and outputs of the system based on the performance of the system.

BACKGROUND OF THE INVENTION

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 7,124,245, ("the '245 patent") entitled "Data Storage System Having Cache Memory Manager with Packet Switching Network", inventors Walton et al., issued Oct. 17, 2006, and assigned to the same assignee as the present invention, which patent is incorporated herein by reference in its entirety.

In such a system, each microprocessor 329 in each of the front end directors 350 is always at full power, in one example at 80 W, in order to enable the system to provide desired storage response times to satisfy unplanned peak workloads. The processor architecture is designed to enable the system to be able to handle peak loads at all times so that response times consistently meet application requirements. However, during low workload times, the processors remain operating at full power, resulting in unnecessary power consumption.

SUMMARY OF THE INVENTION

The present invention is directed to a method and system for minimizing power consumption of a multiprocessor data storage system. The invention utilizes processors that are capable of operating at a number of different reduced power modes, such that the processors operate at full power during peak workloads, but can be powered down during low workload times. The system includes one processor that is preferably a low-power processor, although a high-power processor may be utilized, that is always in operation to service inputs and outputs ("I/Os") through the directors, while other high power processors remain in a power-down mode. When the onset of peak loads are detected through monitoring I/Os per second ("IOPS") and/or response times of the system, the high power processors are brought out of power-down mode to handle the increased IOPS during the peak loads. In this manner, the majority of the high-power processors only operate at full power when the system experiences peak loads. During normal and low load times, the processors are either operated at reduced power or are powered down. This results in a significant reduction in power consumption of the system.

BRIEF DESCRIPTION OF THE DRAWINGS

These and other features of the invention will become more readily apparent from the following detailed description when read together with the accompanying drawings, in which:

FIG. 5 is a graph showing how changes in the amount of I/Os cause the system to switch the processors between operating power modes in accordance with the present invention.

DETAILED DESCRIPTION

Figure 1:
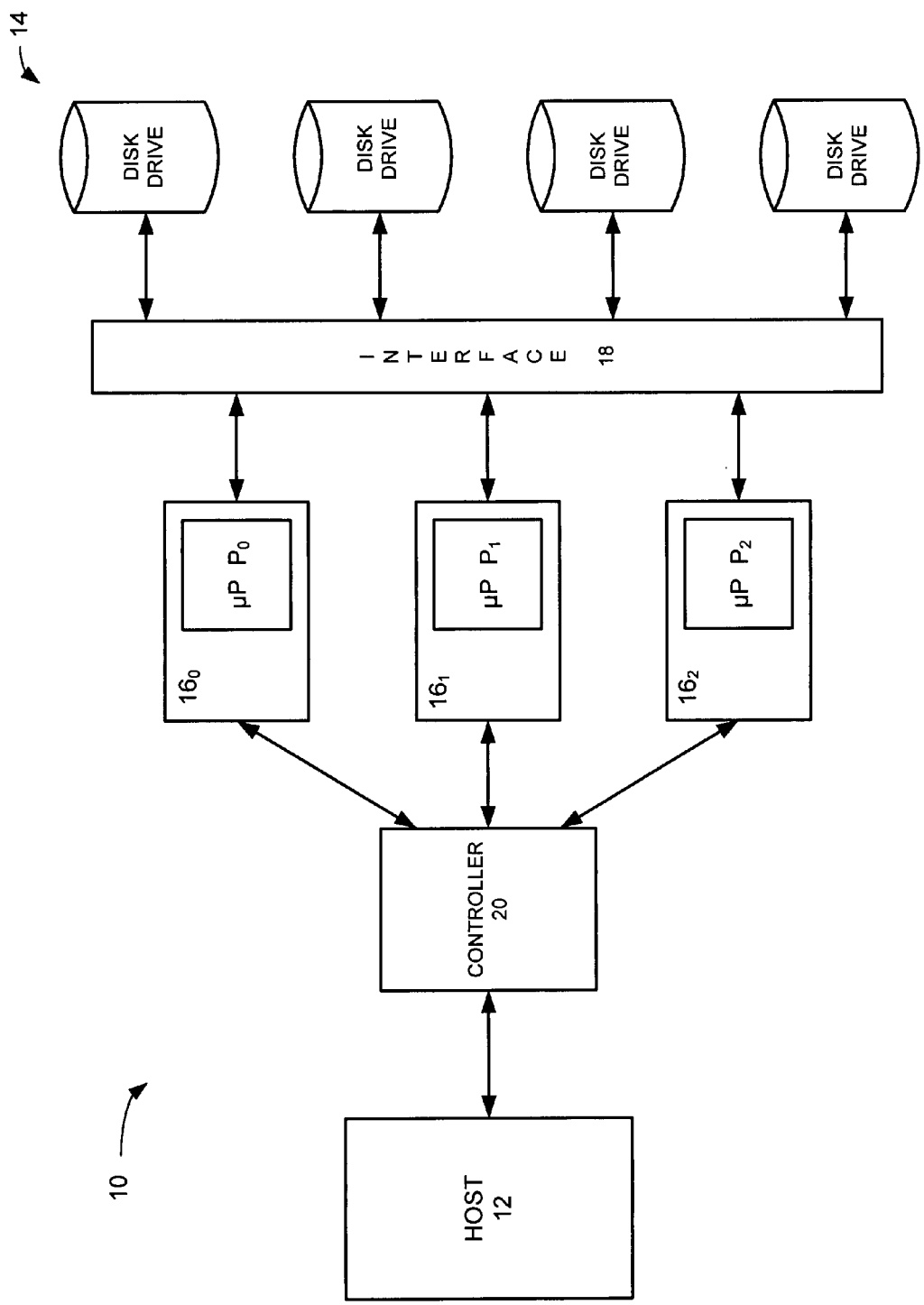
FIG. 1 is a schematic block diagram showing the system for minimizing power consumption of a multiprocessor data storage system in accordance with the present invention.

FIG. 1 is a schematic block diagram of an embodiment of a system 10 for minimizing power consumption of a multiprocessor data storage system. The system 10 includes a host 12 and a bank of disk drives 14. As described in the '245 patent, host 12 sends commands and data to and receives data from disk drives 14. System 10 further includes an interface 18, which corresponds to the network section and backend directors described in the '245 patent. Front end directors $16_0$, $16_1$, and $16_2$ includes processors $P_0$, $P_1$, and $P_2$, respectively, and operate to process data transfers between the host 12 and the disk drives 14, as described in the '245 patent. System 10 further includes a controller 20, which operates to transfer data transfers between the host 12 and the front end directors $16_0$, $16_1$, and $16_2$.

In operation, data transfers, or I/Os are transferred between the host 12 and the disk drives 14 through controller 20. Controller 20 monitors the IOPS and determines at what power level the processors $P_0$, $P_1$, and $P_2$ need to operate to handle the current workload of the system 10. In system 10, processor $P_0$ is always at full power to process I/Os. Processor $P_0$ may be a low-power processor, for further reducing power consumption when the load on the system is low. Alternatively, processor $P_0$ may be a high-power, 80 W processor. Processors $P_1$ and $P_2$ are processor that are capable of operating at different power level modes. An example of one such processor is the 5100 Series of the Intel Xeon processor available from Intel Corporation of Santa Clara, Calif. Such processors are capable of operating at one of four different power levels: full power (C1 mode—80 W), powered-down (C4 mode—1.8 W), and modes C3 and C2, which are between modes C4 and C1. For example, mode C3 could be 25 W and C2 mode could be 50 W. As is known in the art, the higher the operating voltage level, the higher the frequency at which the processor operates to process I/O. Levels C2 and C3 may be chosen to provide a balance of power consumption and processing ability of the processors.

As stated above, while processor $P_0$ is processing I/Os, controller 20 monitors trends in the IOPS. When IOPS are at a low level, relative to the processing capacity of processor $P_0$, only processor $P_0$ operates at full power. When the IOPS increase such that processor $P_0$ is operating at, for example 80% of its capacity, controller 20 instructs processor $P_1$ to switch from C4 mode to C3 mode, in anticipation of the capacity of processor $P_0$ reaching its maximum. Once processor $P_1$ is powered up to mode C3, controller 20 begins directing I/Os to processor $P_1$ for processing. As the IOPS increase, controller 20 will increase the number of I/Os to processor $P_1$ for processing. Controller 20 can instruct processor $P_1$ to power up to mode C2 and then C1 based on the IOPS or, alternatively, as the demand on processor $P_1$ increases, processor $P_1$ can switch itself to higher power modes to handle the increase. Likewise, when the IOPS begin to decrease, controller 20 can instruct processor $P_1$ to power down to lower power modes or, processor $P_1$ can incrementally reduce its own power when detecting the decreased load. In this manner, processor $P_1$ is only powered up when necessary to handle the load on the system and, even when it is powered up, it is only powered at a level that is necessary for handling the level of IOPS and for maintaining the optimal response times of the system.

Figure 2:
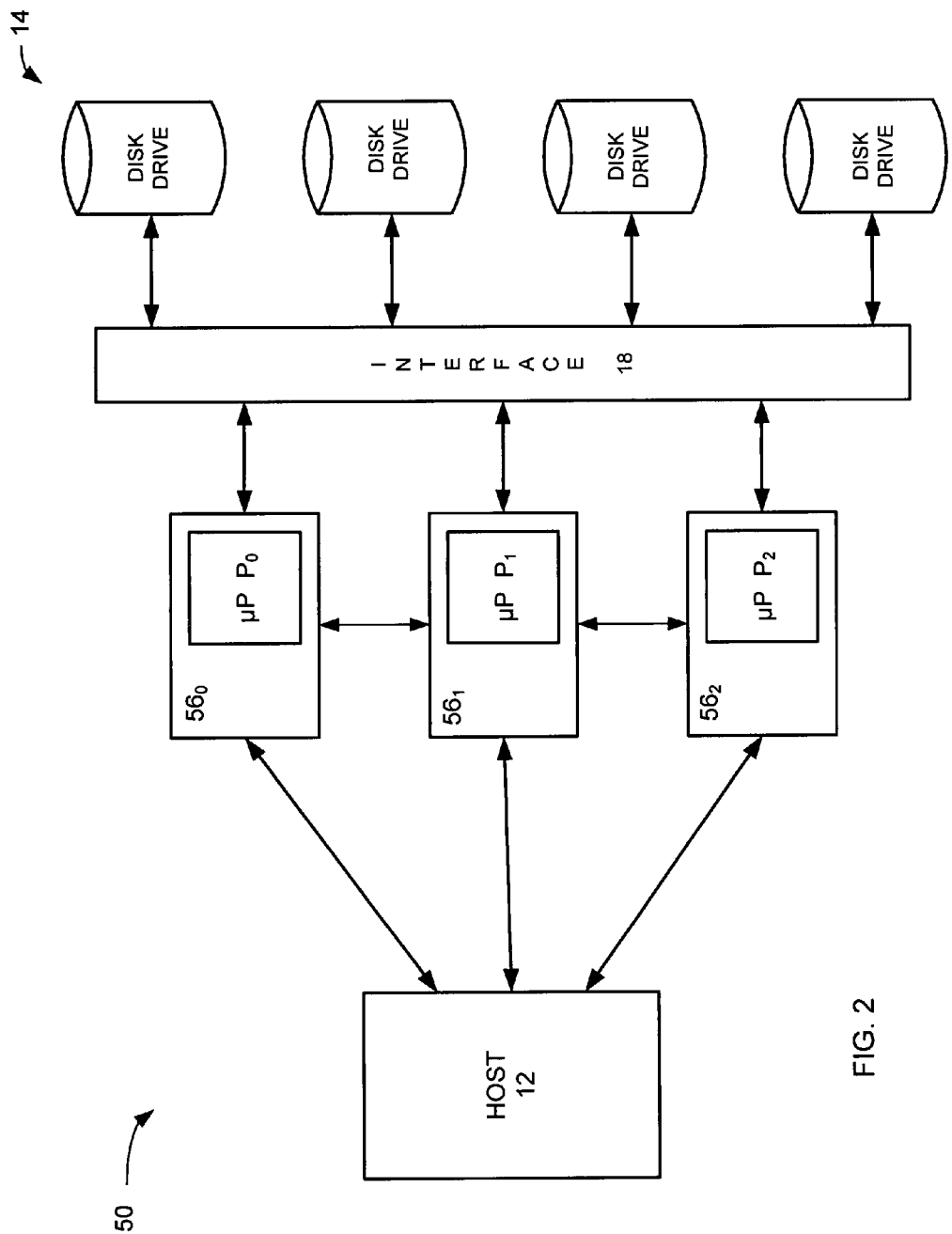
FIG. 2 is a schematic block diagram showing another embodiment of the system for minimizing power consumption of a multiprocessor data storage system in accordance with the present invention.

An alternative embodiment is shown at 50 in FIG. 2. Similar to system 10 of FIG. 1, system 50 includes a host 12 and a bank of disk drives 14. As described in the '245 patent, host 12 sends commands and data to and receives data from disk drives 14. System 10 further includes an interface 18, which corresponds to the network section and backend directors described in the '245 patent.

Front end directors $56_0$, $56_1$, and $56_2$ include processors $P_0$, $P_1$, and $P_2$, respectively, and operate to process data transfers between the host 12 and the disk drives 14, as described in the '245 patent. However, in this embodiment, processor $P_0$ performs the operation of controller 20 of system 10. Accordingly, processor $P_0$ monitors the IOPS and determines at what power level the processors $P_0$, $P_1$, and $P_2$ need to operate to handle the current workload of the system 10. Similar to system 10, in system 50, processor $P_0$ is always at full power to process I/Os. Processor $P_0$ may be a low-power processor, for further reducing power consumption when the load on the system is low. Alternatively, processor $P_0$ may be a high-power, 80 W processor.

In operation, while processor $P_0$ is processing I/Os, it also monitors trends in the IOPS. When IOPS are at a low level, relative to the processing capacity of processor $P_0$, only processor $P_0$ operates at full power. When the IOPS increase such that processor $P_0$ is operating at, for example 80% of its capacity, it instructs processor $P_1$ to switch from C4 mode to C3 mode, in anticipation of the capacity of processor $P_0$ reaching its maximum. Once processor $P_1$ is powered up to mode C3, host 12 detects that processor $P_1$ is powered up and begins directing I/Os to processor $P_1$ for processing. As the IOPS increase, processor $P_0$ instructs processor $P_1$ to power up to mode C2 and then C1 based on the IOPS or, alternatively, as the demand on processor $P_1$ increases, processor $P_1$ can switch itself to higher power modes to handle the increase. Likewise, when the IOPS begin to decrease, processor $P_0$ can instruct processor $P_1$ to power down to lower power modes or, Processor $P_1$ can incrementally reduce its own power when detecting the decreased load. In this manner, processor $P_1$ is only powered up when necessary to handle the load on the system and, even when it is powered up, it is only powered at a level that is necessary for handling the level of IOPS and for maintaining the optimal response times of the system.

Figure 3:
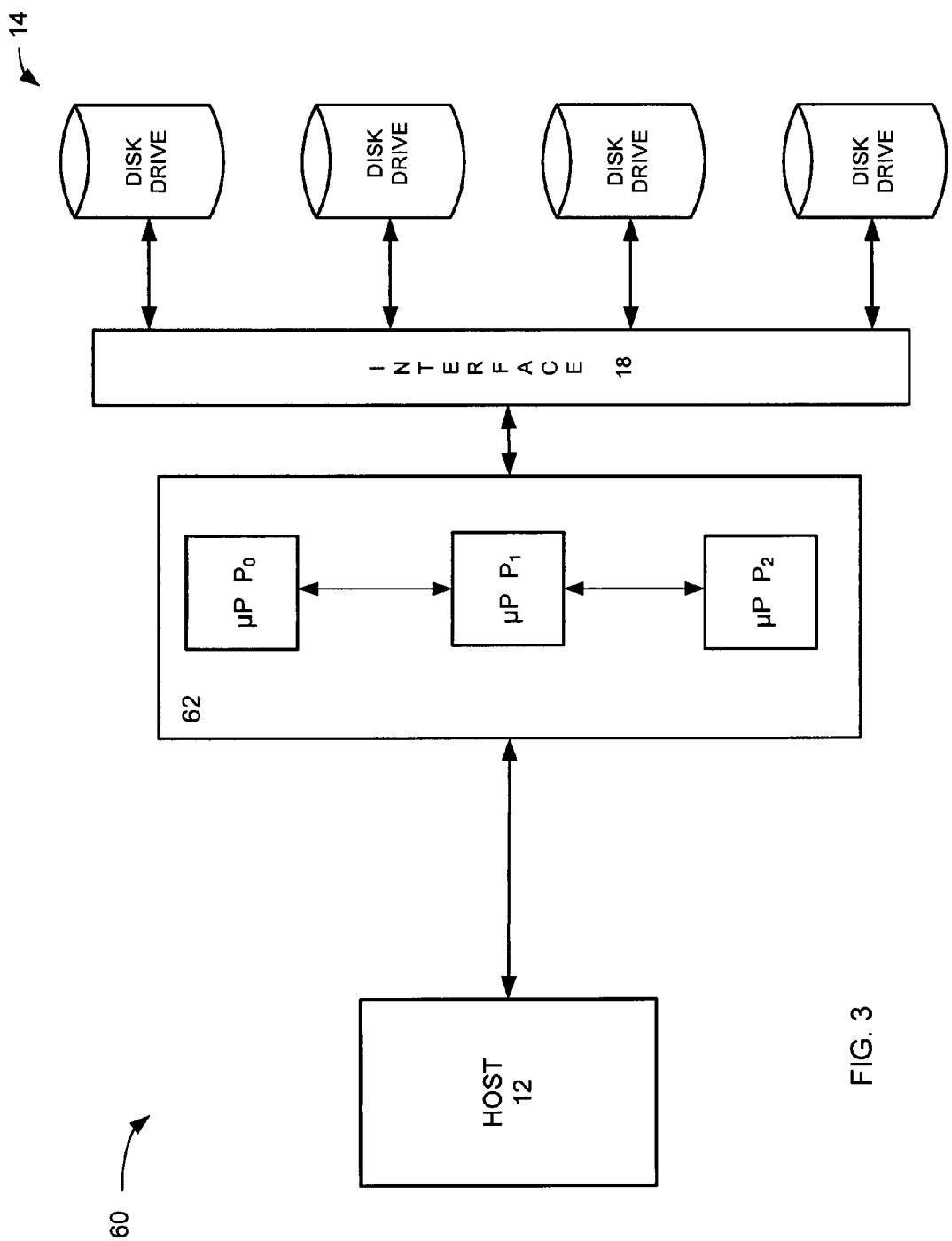
FIG. 3 is a schematic block diagram showing yet another embodiment of the system for minimizing power consumption of a multiprocessor data storage system in accordance with the present invention.

Another alternative embodiment is shown at 60 in FIG. 3. Similar to system 50 of FIG. 2, system 60 includes a host 12 and a bank of disk drives 14. As described in the '245 patent, host 12 sends commands and data to and receives data from disk drives 14. System 60 further includes an interface 18, which corresponds to the network section and backend directors described in the '245 patent.

In FIG. 3, processors $P_0$, $P_1$ and $P_2$ are all disposed on a single front end director 60 and I/Os are input to the director 62 through a common I/O port from the host 12 and a common I/O port from the interface 18. The operation of system 60 is essentially the same as the operation of system 50, in that processor $P_0$ monitors the IOPS and determines at what power level the processors $P_0$, $P_1$, and $P_2$ need to operate to handle the current workload of the system 60. Similar to system 50, in system 60, processor $P_0$ is always at full power to process I/Os. Processor $P_0$ may be a low-power processor, for further reducing power consumption when the load on the system is low. Alternatively, processor $P_0$ may be a high-power, 80 W processor.

In operation, while processor $P_0$ is processing I/Os, it also monitors trends in the IOPS. When IOPS are at a low level, relative to the processing capacity of processor $P_0$, only processor $P_0$ operates at full power. When the IOPS increase such that processor $P_0$ is operating at, for example 80% of its capacity, it instructs processor $P_1$ to switch from C4 mode to C3 mode, in anticipation of the capacity of processor $P_0$ reaching its maximum. Once processor $P_1$ is powered up to mode C3, host 12 detects that processor $P_1$ is powered up and begins directing I/Os to processor $P_1$ for processing. As the IOPS increase, processor $P_0$ instructs processor $P_1$ to power up to mode C2 and then C1 based on the IOPS or, alternatively, as the demand on processor $P_1$ increases, processor $P_1$ can switch itself to higher power modes to handle the increase. Likewise, when the IOPS begin to decrease, processor $P_0$ can instruct processor $P_1$ to power down to lower power modes or, Processor $P_1$ can incrementally reduce its own power when detecting the decreased load. In this manner, processor $P_1$ is only powered up when necessary to handle the load on the system and, even when it is powered up, it is only powered at a level that is necessary for handling the level of IOPS and for maintaining the optimal response times of the system.

Figure 4:
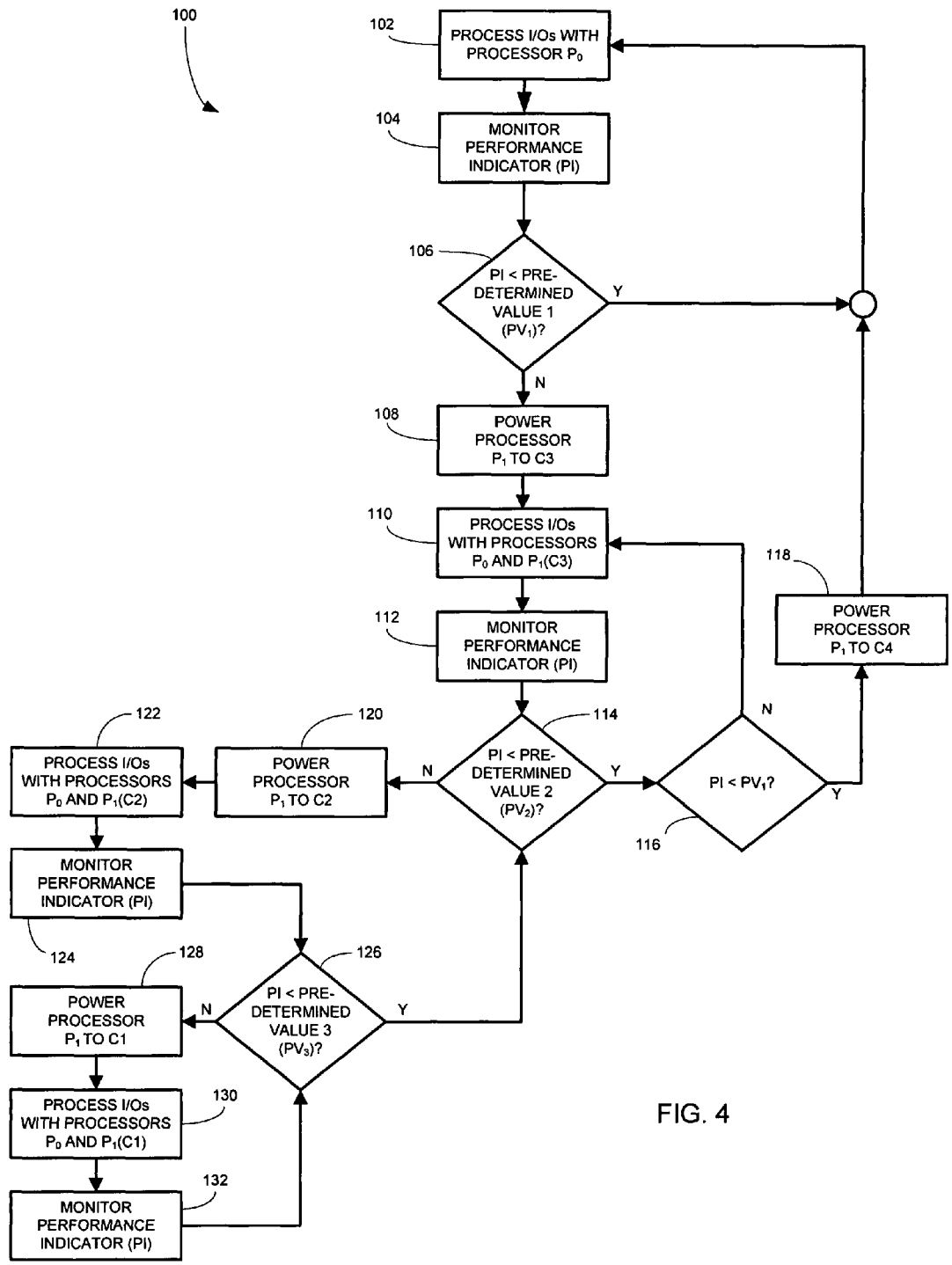
FIG. 4 is a flow diagram showing the steps involved in the method of minimizing power consumption of a multiprocessor data storage system in accordance with the present invention.

FIG. 4 is a flow diagram 100 showing the steps involved in the method of minimizing power consumption in a multiprocessor data storage system. In Step 102, when the system is booted up, processor $P_0$ begins processing I/Os, while processor $P_1$ is in mode C4. During this time, and throughout the operation of the system, a performance indicator, PI, such as IOPS, for example, is monitored, Step 104. It will be understood that other performance indicators, such as response time or operating bandwidth of the system may be monitored during the operation of the system. The monitoring of Step 104 may be performed by controller 20 in the case of system 10, or by processor $P_0$, in the case of system 50. If PI is determined to be below a first predetermined value $PV_1$, Step 106, meaning that processor $P_0$ is capable of handling the rate of IOPS, the system returns to Step 102 and processor $P_0$ continues to process I/Os.

If, in Step 106, the performance indicator is determined to be greater than $PV_1$, processor $P_1$ is powered up to mode C3, Step 108. In system 10, controller 20 instructs processor $P_1$ to power up to mode C3 and in system 50, processor $P_0$ provides the instruction.

I/Os are then processed with processor $P_0$ and processor $P_1$ in C3 mode, Step 110. The performance indicator continues to be monitored, Step 112 and if it is below a predetermined value 2, $PV_2$, Step 114, and if PI is greater than $PV_1$, the system continues to process I/Os with processor $P_0$ and processor $P_1$ in C3 mode, Step 110. If PI is determined to be less than $PV_1$, Step 116, processor $P_1$ is powered down to mode C4, Step 118, and the system returns to Step 102 and processor $P_0$ continues to process I/Os. As discussed above, the instruction to power down processor $P_1$ can come from controller 20 in system 10 and from processor $P_0$ in system 50. Alternatively, processor $P_1$ can incrementally reduce its own power when detecting the decreased load.

If, in Step 114, it is determined that PI is greater than $PV_2$, processor $P_1$ is powered to mode C2, Step 120. Again, in system 10, controller 20 instructs processor $P_1$ to power up to mode C2 and in system 50, processor $P_0$ provides the instruction. Alternatively, as the demand on processor $P_1$ increases, processor $P_1$ can switch itself to higher power modes to handle the increase. I/Os are then processed with processor $P_0$ and processor $P_1$ in C2 mode, Step 122. The performance indicator PI continues to be monitored, Step 124, to determine if it is below a predetermined value 3, $PV_3$, Step 126. If it is, the system returns to Step 114 to determine if processor $P_1$ will continue to process I/Os in C2 mode. If PI is determined to be greater than $PV_3$ in Step 126, processor $P_1$ is powered up to mode C1, Step 128. I/Os are then processed with processor $P_0$ and processor $P_1$ in C1 mode, Step 130. The performance indicator PI continues to be monitored, Step 132, to determine if it is below a predetermined value 3, $PV_3$, Step 126. If it is, the system returns to Step 114 to determine if processor $P_1$ will continue to process I/Os in C2 mode. This process continues during the operation of the respective systems 10 and 50. Although not specifically shown, processor $P_2$ may be powered up in a similar fashion as processor $P_1$, when processor $P_1$ is operating in the C1 mode and the IOPS, for example, continue to increase beyond the capacity of $P_0$ and $P_1$ operating at C1.

FIG. 5 is a graph showing how changes in the amount of I/Os cause the system to switch the processors between operating power modes. The graphs shows the number of I/Os processed by the system over time (IOPS). During period A, between times t1 and t2, when IOPS are relatively low, the system operates with processor $P_0$ and processor $P_1$ in C4 mode. During period B, between times t2 and t3, when the IOPS increase beyond, for example, 80% of the capacity of processor $P_0$, processor $P_1$ is powered up to mode C3 and the system operates with processor $P_0$ and processor $P_1$ in C3 mode. After time t3, during period C, when the IOPS have increased further, processor $P_1$ is powered up to mode C2 and the system operates with processor $P_0$ and processor $P_1$ in C2 mode.

After time t4, the IOPS begin to decrease. Therefore, during period D, processor $P_1$ is powered down to mode C3 and the system operates with processor $P_0$ and processor $P_1$ in C3 mode. During period E, the system operates with processor $P_0$ and processor $P_1$ in C4 mode. Between times t6 and t8, as the IOPS increase, processor $P_1$ is powered up first to mode C3 and then to mode C2. During period H, after the IOPS have increased further, processor $P_1$ is powered up to mode C1 and the system operates with processor $P_0$ and processor $P_1$ in C1 mode.

Accordingly, the system enables a data storage system to minimize its power consumption by only powering up processors to a level that is necessary for processing the loads that the system is experiencing.

The invention may be embodied in other specific forms without departing from the spirit or essential characteristics thereof. For example, although the invention has been described in connection with a data storage system, it will be understood that the invention may be utilized in any multiprocessor system that processes I/Os. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A system for minimizing power consumption in a multiprocessor device comprising:
   a data storage device;
   a host for transmitting data transfer commands to the data storage device, the data transfer commands being for reading data from and writing data to the data storage device;
   a first processor configured for receiving data transfer commands and transmitting the commands to the data storage device;
   a second processor configured for receiving data transfer commands and transmitting the commands to the data storage device, the second processor being capable of operating in different power level modes; and
   a controller for receiving data transfer commands from the host and transmitting the data transfer commands to the first processor for processing during a first mode of operation, in which the second processor is in a first power level mode and only the first processor is processing the data transfer commands;
   wherein the controller monitors data transfer requests between the host and the data storage device and, when a rate of data transfer commands increases to a first predetermined amount, the controller causes the system to operate in a second mode of operation in which the second processor is powered up to a second power level mode, which is less than full power, and the first processor and the second processor process the data transfer commands.

* * * * *